US011322919B2

(12) United States Patent
Pineaud et al.

(10) Patent No.: US 11,322,919 B2
(45) Date of Patent: May 3, 2022

(54) CABLE ENTRY DEVICE FOR ELECTRICAL CABLE HOUSED IN A CONDUIT

(71) Applicant: COOPER CAPRI SAS, Nouan-le-Fuzelier (FR)

(72) Inventors: Nicolas Pineaud, Neuvy-sur-Barengeon (FR); Silvin Lebon, Salbris (FR)

(73) Assignee: COOPER CAPRI SAS

( * ) Notice: Subject to any disclaimer, the term of this patent is extended or adjusted under 35 U.S.C. 154(b) by 607 days.

(21) Appl. No.: 16/286,695

(22) Filed: Feb. 27, 2019

(65) Prior Publication Data

US 2019/0267781 A1    Aug. 29, 2019

(30) Foreign Application Priority Data

Feb. 27, 2018   (FR) .................................... 1851720

(51) Int. Cl.
*F16L 15/04* (2006.01)
*H02G 15/04* (2006.01)
*H02G 3/04* (2006.01)

(52) U.S. Cl.
CPC ............ *H02G 3/0406* (2013.01); *F16L 15/04* (2013.01); *H02G 3/0481* (2013.01); *H02G 15/04* (2013.01)

(58) Field of Classification Search
CPC .... H02G 15/04; H02G 3/0406; H02G 3/0481; H02G 3/06; F16L 15/04
USPC ...................................................... 285/357
See application file for complete search history.

(56) References Cited

U.S. PATENT DOCUMENTS

| 5,777,269 | A | * | 7/1998 | Handley | ................ | H02G 15/04 |
| | | | | | | 174/78 |
| 9,640,919 | B2 | * | 5/2017 | Loveless | ............ | H01R 13/5205 |

FOREIGN PATENT DOCUMENTS

| EP | 0 490 637 A1 | | 6/1992 |
| GB | 2 276 773 A | | 10/1994 |
| GB | 2296998 | * | 1/1995 |
| GB | 2 296 998 A | | 7/1996 |
| GB | 1077517 | * | 2/2001 |
| GB | 2427082 | * | 6/2006 |
| GB | 2450519 | * | 6/2007 |

OTHER PUBLICATIONS

Search Report dated Nov. 19, 2018 in corresponding French Patent Application No. 1851720.

* cited by examiner

*Primary Examiner* — Timothy J Thompson
*Assistant Examiner* — Michael F McAllister
(74) *Attorney, Agent, or Firm* — Ostrolenk Faber LLP

(57) ABSTRACT

A gland (1) for an electrical cable inside a threaded protective conduit, the gland includes a tubular body (2) enclosing a sealing ring (3), an annular nut (4) screwed on to the body to compress the sealing ring, a tubular connecting sleeve connected to the nut, an end portion of the nut (4) opposed to the body (5) having a threaded part (51) for connection to the threaded conduit, the sleeve having a connecting bore (52) mounted by force-fitting on an outer surface (42) of the end portion of the nut, the connecting sleeve having an annular groove (54) on an inner surface (53) of the connecting bore; the outer surface of the nut (4) having a relief surface (43) which engages in the groove (54) during the force-fitting, so as to retain the sleeve on the end portion of the nut while allowing the sleeve to rotate freely around the nut.

7 Claims, 3 Drawing Sheets

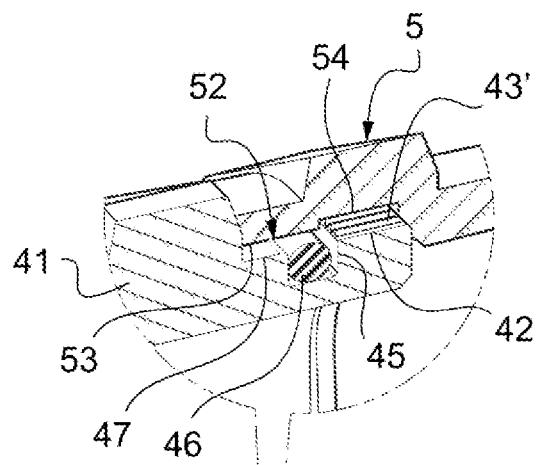
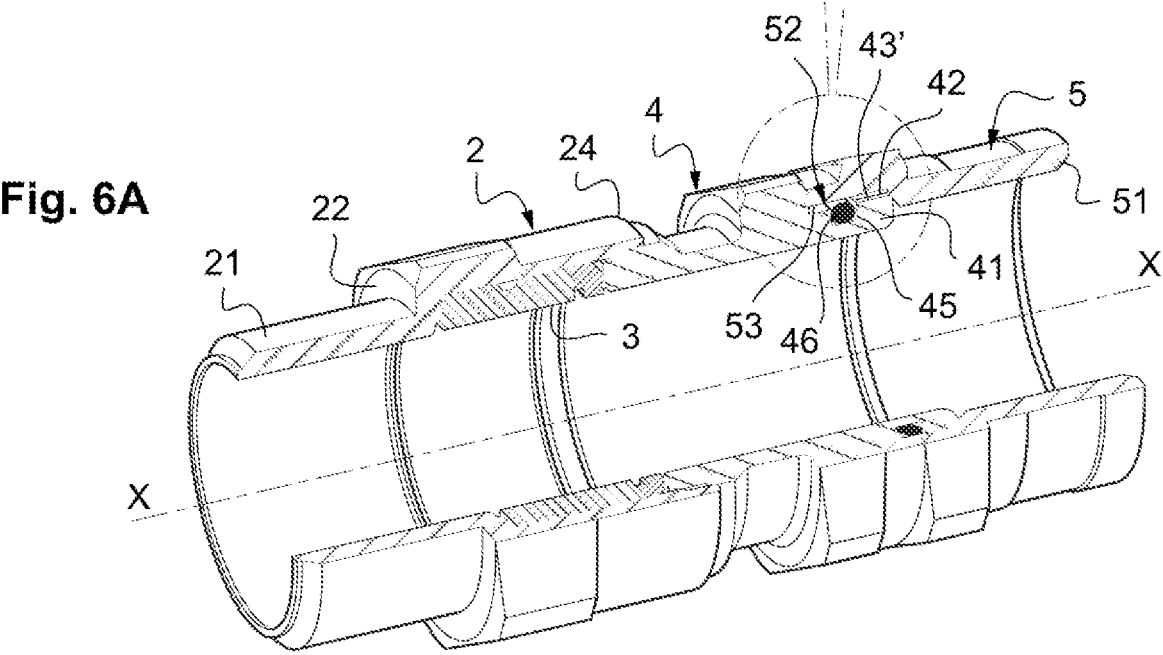

CABLE ENTRY DEVICE FOR ELECTRICAL CABLE HOUSED IN A CONDUIT

CROSS-REFERENCE TO RELATED APPLICATIONS

The present application claims priority of French Patent Application No. 1851720, filed Feb. 27, 2018, the contents of which are incorporated by reference herein.

TECHNICAL BACKGROUND

The present invention relates to a cable entry device or gland, and more particularly to a gland adapted to be positioned on a wall of an enclosure to provide a seal for the passage of an electrical cable passing through the wall. The electrical cable is led towards the enclosure in a protective conduit comprising a thread for connection to the gland, the gland comprising a tubular body having a threaded end for fastening to the wall, the tubular body contains a compressible sealing ring, an annular nut adapted to be screwed on to a tapped end of the tubular body opposite to the threaded end to compress the sealing ring, and, connected to the annular nut at an end portion of the annular nut opposite to the tubular body, a tubular connecting sleeve comprising a threaded part adapted to interact by screwing with the connecting thread of the protective conduit.

The field of application of the invention is, more specifically, that of glands according to international electrical equipment standards for use in hazardous environments, and more particularly in explosive atmospheres (particularly those covered by the international certification system IECEx). This equipment is known as "Ex" equipment. Such "Ex" glands are adapted to allow cables to pass into an electrical enclosure placed in an explosive atmosphere, while maintaining the integrity of the protection of the enclosure and the safety of the electrical installation. In particular, the principles of installation in this context are complied with by screwing the gland directly on to the wall of the enclosure, or, for non-tapped holes, by fastening it to the penetrated wall with a lock nut. The sealing ring provides a seal, particularly against flammable gases and dusts.

In some installations, cables, whether armoured or non-armoured, may be led inside protective conduits, of the flexible metal conduit type for example, notably in order to provide additional mechanical protection. This is an alternative to the employment of screened cables for use in a hazardous environment as mentioned above. In such installations, the protective conduit inside which the cable is led must be connected to the electrical enclosure by means of an "Ex" gland. In this context, a number of solutions have been developed for adapting these glands, to enable the gland to be connected to the protective conduit.

Thus there is a known gland according to the generic definition given above, which accordingly comprises, in particular, a tubular connecting sleeve, connected to the actuating nut of the gland joint, with a threaded part adapted to provide a screwed connection to the connecting thread of the protective conduit.

The CMP Products Ltd company markets glands of this type under the reference A2F-FC. These glands are intended for applications in explosive atmospheres, in which the connecting sleeve, which is screwed inside the protective conduit, is fastened between the actuating nut of the sealing ring and the sealing ring itself, so as to allow rotary motion sliding between the connecting sleeve and the nut mounted on the latter, before assembly. However, once the actuating nut of the sealing ring has been tightened on to the body of the gland to put it under tension to provide the seal, the connecting sleeve is no longer free to rotate. Thus the connecting sleeve of the gland must be fastened to the protective conduit first, before the gland is put under tension by tightening the nut on to the body. Otherwise, if an operator attempts to screw the connecting sleeve on to the protective conduit, the torque applied to the connecting sleeve will be transmitted to the actuating nut, which will thus tend to slacken, adversely affecting the seal of the gland.

In the particular context of glands, which are intended to be used in potentially explosive atmospheres, an incorrect installation of the gland contributes to the loss of explosion protection.

SUMMARY OF THE INVENTION

In this context, the object of the present invention is to propose a gland which is capable of being adapted to different possible assembly configurations of the gland with a protective cable inlet conduit, and which is, in particular, capable of allowing assembly when the gland is already under tension, without compromising the sealing function of the gland.

To this end, the gland of the invention, which conforms in other respects to the generic definition given in the preceding preamble, is essentially characterized in that the tubular connecting sleeve comprises a connecting bore mounted by force-fitting on an outer surface of the end portion of the annular nut, the sleeve having an annular groove on an inner surface of the connecting bore, and the outer surface of the end portion of the nut having a relief surface arranged so as to engage in the annular groove when the connecting bore is force-fitted on to the end portion, the engagement of the relief surface in the annular groove thus retaining the sleeve on the end portion of the nut and allowing the sleeve to rotate freely around the end portion of the nut.

Thus, owing to this arrangement, the gland of the invention is equipped with a connecting sleeve enabling the gland to be connected to a protective inlet conduit of the cable, which, after assembly on to the gland, remains freely rotatable relative to the annular nut to which it is connected, regardless of the tightening of the latter on to the body of the gland. Furthermore, the assembly created by this force-fitting is such that it cannot be dismantled without damaging the nut or the sleeve. In other words, because of the retaining function of the sleeve provided by the assembly, the sleeve is captive once it is mounted on the gland.

Advantageously, the outer surface of the end portion of the nut comprises an annular channel positioned downstream of the relief surface relative to the direction of introduction of the sleeve, in which is inserted a ring seal adapted to come into contact with the inner surface of the connecting bore of the sleeve, enabling the friction to be increased during the rotation of the sleeve to provide a controlled rotation while ensuring the seal between the outer surface of the nut and the inner surface of the connecting bore of the sleeve.

Advantageously, the end portion of the nut comprises an outer centering surface positioned downstream of the annular channel relative to the direction of introduction of the sleeve, adapted to interact with the inner surface of the connecting bore of the sleeve facing it, while leaving a functional clearance between these components so as to ensure the centering of the sleeve on the end portion of the nut.

Preferably, the inner surface of the connecting bore and the relief surface of the outer surface of the end portion of the nut are designed so as to provide an interference fit, of the standardized H7p6 type for example, between these two surfaces.

Advantageously, the relief surface is a milled surface. Thus, because of the milling performed on the relief surface, it is possible to reduce the tolerances for the fitting of the connecting bore of the sleeve on the end portion of the nut.

Advantageously, the connecting sleeve has a rounded chamfer at its end receiving the end portion of the annular nut, the relief surface of the outer surface of the end portion comprising a complementary chamfer facing the rounded chamfer.

Preferably, the tubular connecting sleeve comprises a threaded bore opposed to the connecting bore, intended to receive a male threaded end of the protective conduit.

Other features and advantages of the invention will be apparent from a perusal of the following description of a particular embodiment of the invention, provided for guidance but in a non-limiting way, with reference to the attached drawings, in which:

BRIEF DESCRIPTION OF THE DRAWINGS

FIG. 6A is a schematic perspective view, in axial section, of a variant embodiment of a gland according to the invention; and FIG. 6B is a detail of a part of FIG. 6A.

DESCRIPTION OF AN EMBODIMENT

Figure 1B:
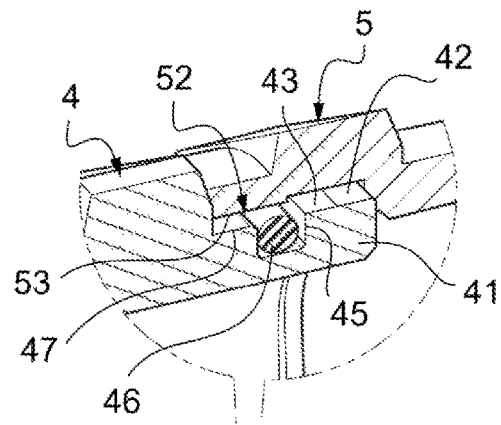
FIG. 1B is a detail of a part of FIG. 1A.

In these Figures, identical reference numerals, possibly with the addition of a prime symbol, denote identical or similar parts.

Figure 1A:
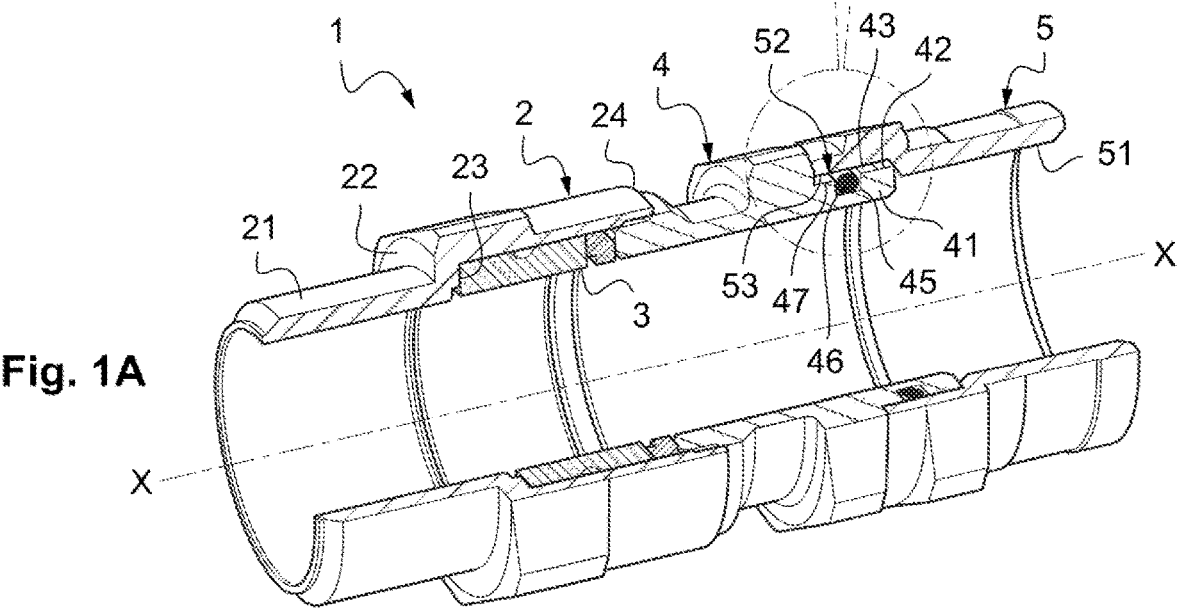
FIG. 1A is a schematic perspective view, in axial section, of a first embodiment of a gland according to the invention.

With reference to FIG. 1A, the gland 1 comprises, firstly, a tubular body 2 comprising an end 21 intended to pass through a wall (not shown) on which the gland is to be mounted. This end 21 intended to pass through the wall has an annular stop shoulder 22 delimiting a thread (not shown) which may interact, for fastening the gland 1 on to the wall, by means of a thread of the wall, or possibly with a locking nut on the face of the wall opposed to that on which the annular shoulder 22 bears.

The body 2 of the gland 1 also has an inner shoulder 23, on which a compressible sealing ring 3 bears. This compressible sealing ring 3 is designed to be compressed against the inner shoulder 23 of the body 2 by an annular nut 4, which is screwed on to a tapped end 24 of the body 2, opposite to its threaded end 21. This arrangement enables the sealing ring 3 to be deformed in the direction of the longitudinal axis X-X of the gland 1. For this purpose, the sealing ring 3 may be made of an elastomeric material or natural rubber.

In FIGS. 1A and 1B, the part of the annular nut 4 opposite to the body 2 of the gland 1 is terminated by an end portion 41, intended to provide the connection to a tubular connecting sleeve 5, for connecting the gland 1 to a protective conduit (not shown), of the flexible metal conduit type for example, inside which is led an electrical cable that has to pass through the wall by means of the gland 1. Such a protective conduit is conventionally provided with a threaded end for its connection to the gland. Accordingly, at its end opposite to the end portion 41 of the annular nut 4 to which it is connected, the tubular connecting sleeve 5 comprises an end part 51 intended to interact by screwing to the threaded end of a protective conduit. The latter threaded end comprises, for example, a male threaded end. Thus the end part 51 of the sleeve 5 may have a threaded bore (a female inner thread) intended to receive the male threaded end of the protective conduit.

The different parts of the gland 1 formed by the body 2, the nut 4 and the sleeve 5 are preferably made in one piece from a metallic material such as brass, steel, bronze or aluminium, for example, or from a rigid plastic material such as polyamide, for example.

As may be seen more readily in FIGS. 2-5, for the connection of the tubular connecting sleeve 5 to the gland, the sleeve 5 comprises a connecting bore 52, opposite to the threaded bore 51, mounted by force-fitting on a cylindrical outer surface 42 of the end portion 41 of the annular nut 4. The axes of the sleeve 5 and the nut 4 coincide with the axis of the body 2 on which the nut 4 is mounted. More precisely, the connecting bore 52 of the sleeve 5 comprises a cylindrical inner surface 53, defining the smallest inside diameter of the connecting bore 52, on which an annular groove 54 is formed, defining the largest inside diameter of the connecting bore 52, while the outer surface 42 of the end portion 41 of the nut 4 has a relief surface 43 arranged so as to engage in the annular groove 54 of the connecting bore 52 of the sleeve when the latter is force-fitted on the end portion 41 of the nut 4, by means of a press for example, along the direction of introduction indicated by the arrow F. Thus the engagement of the relief surface 43 of the end portion 41 of the nut 4 in the annular groove 54 of the connecting bore 52 of the sleeve 5 enables the sleeve to be retained on the end portion 41 of the nut 4 and also allows the sleeve 5 to rotate freely around the end portion 41 of the nut 4.

In other words, this relief surface 43 of the outer surface 42 of the end portion 41 of the nut 4 is designed so as to create interference with the smallest inside diameter of the connecting bore 52, and thus forms an anti-return stop for the sleeve as a result of this interference.

In practice, according to a first embodiment as shown in FIGS. 1-5, this interference may be created by an interference fit between the relief surface 43 of the outer surface 42 of the end portion 41 of the nut 4 and the inner surface 53 of the connecting bore 52 of the sleeve 5. Thus the relief surface 43 of the outer surface 42 of the end portion 41 of the nut 4 and the inner surface 53 of the connecting bore 52 are designed so as to provide an interference fit, for example an interference fit of the standardized H7p6 type, between these two surfaces.

With reference to FIG. 6A, according to an alternative or complementary embodiment, provision is made for the relief surface of the outer surface 42 of the end portion 41 of the nut 4 to be a milled surface area 43'. "Milled surface" is taken to mean that the surface in question is striated in the longitudinal direction shown by the axis X-X, by a set of longitudinal grooves forming a succession of peaks and troughs, to facilitate the force-fitting of the sleeve 5. Thus the inner surface 53 of the connecting bore 52 of the sleeve is clamped on to the peaks of the milled relief surface 43' during the force-fitting, allowing the tolerances on the fitting of the connecting bore of the sleeve on the end portion of the nut to be looser, because of the greater deformability of the milled surface.

Additionally, in order to facilitate the rotation of the connecting sleeve 5 around the nut 4 after its force-fitting, the outer surface 42 of the end portion 41 of the nut 4 comprises an annular channel 45, positioned downstream of the relief surface 43 relative to the direction of introduction F of the sleeve 5, in which is inserted a ring seal 46 adapted to come into contact with the inner surface 53 of the connecting bore 52 of the sleeve 5. The seal 46 enables the friction during the rotation of the sleeve 5 to be increased in order to provide controlled rotation of the sleeve, as opposed to free rotation, while providing a seal between the outer surface 42 of the nut and the inner surface 53 of the connecting bore 52 of the sleeve. The ring seal 46 may be made of an elastomeric material or natural rubber, and is, for example, made of silicone.

Figure 2:
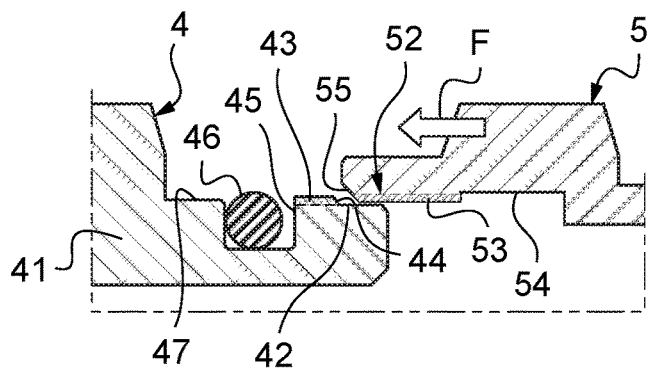
FIGS. 2 to 4 are schematic sectional views of the gland of FIG. 1, showing the placing of the connecting sleeve on the gland.
Figure 3:
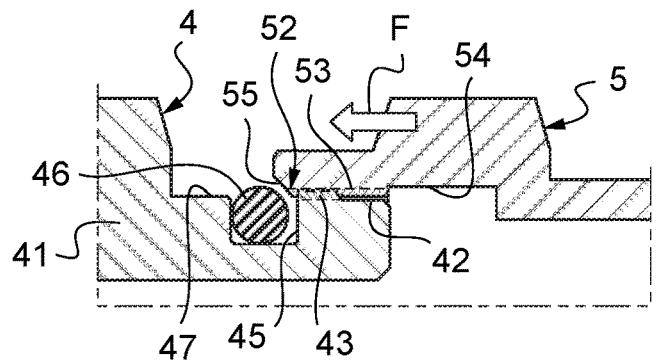
Figure 4:
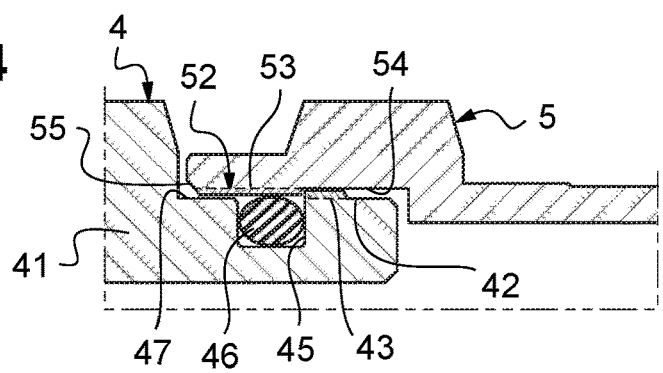
Figure 5:
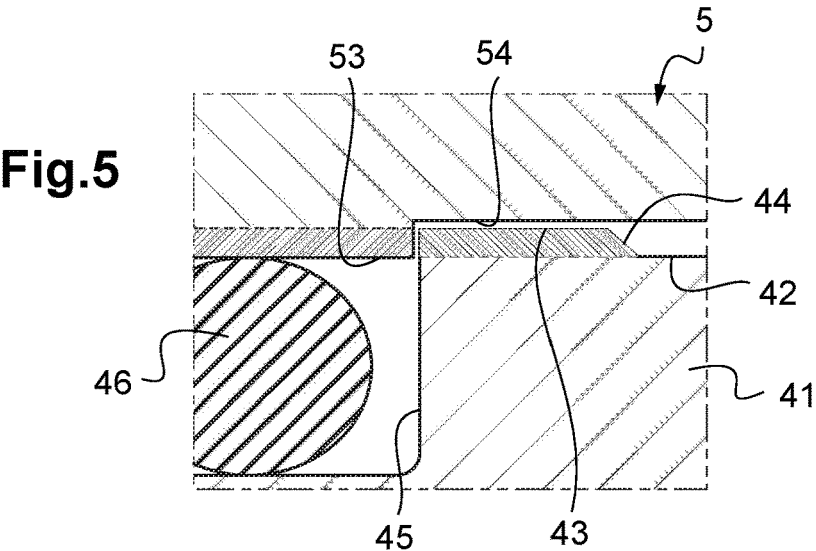
FIG. 5 is a detail view of the gland of FIG. 1, showing the area of interference between the annular nut and the connecting sleeve.

Referring to FIGS. 2-5, the connecting sleeve 5 may have a chamfer 55 at its end receiving the end portion 41 of the annular nut 4, the relief surface 43 of the end portion 41 comprising a complementary chamfer 44 in FIG. 2 facing the chamfer 55. Thus, when the sleeve 5 is force-fitted on the end portion of the nut 4, the chamfer 55 of the sleeve 5 and the complementary chamfer 44 of the relief surface 43 of the end portion 41 of the annular nut 4 interact to facilitate the force-fitting of the sleeve. The chamfer 55 is preferably a rounded chamfer or radius enabling the integrity of the ring seal to be preserved during the force-fitting of the sleeve on to the end portion of the nut.

Additionally, the end portion 41 of the annular nut 4 comprises another, centering, outer surface 47, positioned downstream of the annular channel 45 relative to the direction of introduction F of the sleeve 5. Advantageously, after the force-fitting of the sleeve 5 on the nut 4, this outer centering surface 47 is intended to interact with the inner surface 53 of the connecting bore 52 of the sleeve 5 facing it, while leaving a functional clearance between these components, so as to ensure the centering of the sleeve 5 on the end portion 41 of the nut 4. Similarly, the part of the inner surface 42 of the end portion 41 of the nut 4 positioned upstream of the relief surface 43 relative to the direction of introduction F of the sleeve 5 enables the sleeve 5 to be centered before its force-fitting.

Regarding the order in which the parts are fastened, it may be preferable to start by attaching and fastening the nut 4 to the body 2 of the gland, by screwing the nut 4 on to the body, and then force-fitting the sleeve 5 on to the nut 4. However, it would be perfectly possible, without departing from the scope of the invention, to consider a reverse order in which the sleeve 5 is first attached and fastened to the nut 4, before attaching this assembly to the body 1.

The solution described above for the connection of the gland to a threaded conduit is not limited to any particular type of gland, and, notably, the method of assembling the freely rotatable connecting sleeve is equally applicable either to a gland for a non-armoured or to a gland for an armoured cable.

The invention claimed is:

1. A gland configured to be positioned on a surface to provide a seal for passage of a cable through the surface, wherein the cable is to be led inside a protective conduit, the conduit comprising a thread for connection to the gland, the gland comprising:

a tubular body having a threaded end with a thread configured for connecting the gland for fastening the gland to the surface;
a compressible sealing ring enclosed in the tubular body;
an annular nut configured to be screwed on to a tapped end of the tubular body, the tapped end is opposite the threaded end to compress the sealing ring, and, a tubular connecting sleeve connected to the annular nut at an end portion of the annular nut opposite to the tubular body, the tubular connecting sleeve having a threaded part configured to interact by screwing on the connecting thread of the protective conduit;
the tubular connecting sleeve comprises a connecting bore force-fitted on to an outer surface of the end portion of the annular nut; and
the connecting sleeve having an annular groove on an inner surface of the connecting bore of the sleeve and the outer surface of the end portion of the nut having a relief surface configured to engage in the annular groove when the connecting bore is force-fitted on to the end portion, wherein the engagement of the relief surface in the annular groove is configured for retaining the sleeve on the end portion of the nut and for allowing the sleeve to rotate freely around the end portion of the nut.

2. A gland according to claim 1, further comprising:
the outer surface of the end portion of the annular nut comprises an annular channel positioned downstream of the relief surface relative to the direction of introduction of the sleeve, a ring seal being inserted into the annular channel and configured to come into contact with the inner surface of the connecting bore of the sleeve, for enabling friction to be increased during the rotation of the sleeve to provide controlled rotation while ensuring a seal between the outer surface of the nut and the inner surface of the connecting bore of the sleeve.

3. A gland according to claim 2, further comprising:
the end portion of the nut comprises an outer centering surface positioned downstream of the annular channel relative to the direction of introduction of the sleeve, the centering surface is configured to interact with the inner surface of the connecting bore of the sleeve facing it, while leaving a functional clearance between these components to provide the centering of the sleeve on the end portion of the nut.

4. A gland according to claim 1, wherein the inner surface of the connecting bore and the relief surface of the outer surface of the end portion of the nut are configured to provide an interference fit, of the standardized H7p6 type, between the two surfaces.

5. A gland according to claim 1, wherein the relief surface is a milled surface.

6. A gland according to claim 1, further comprising the tubular connecting sleeve has a rounded chamfer at the end thereof receiving the end portion of the annular nut, the relief surface of the outer surface of the end portion comprises a complementary chamfer facing the rounded chamfer.

7. A gland according to claim 1, further comprising the tubular connecting sleeve comprises a threaded bore opposed to the connecting bore, and is configured to receive a male threaded end of the protective conduit.

* * * * *